Figure 1:
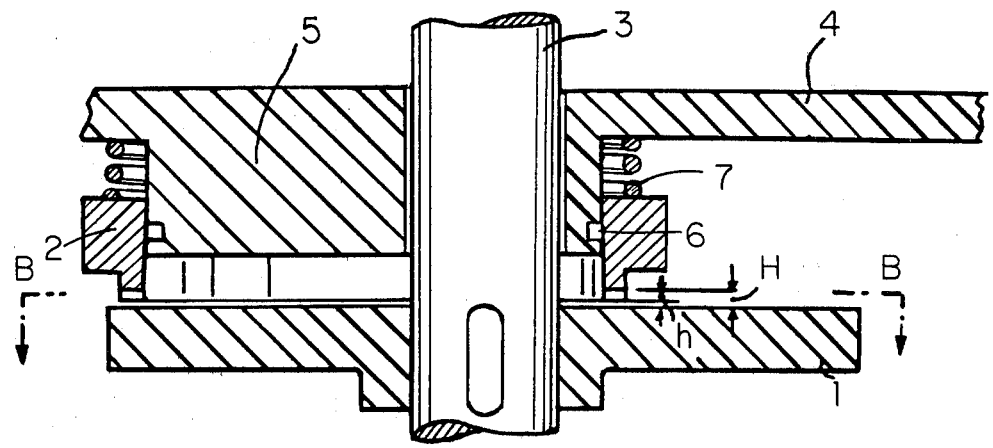

United States Patent [19]

Etsion

[11] 4,407,509
[45] Oct. 4, 1983

[54] ZERO-LEAKAGE NON-CONTACTING MECHANICAL FACE SEAL FOR ROTARY MACHINES

[75] Inventor: Izhak Etsion, Haifa, Israel

[73] Assignee: Technion Research & Development Foundation Ltd., Haifa, Israel

[21] Appl. No.: 340,246

[22] Filed: Jan. 18, 1982

[30] Foreign Application Priority Data

Mar. 11, 1981 [IL] Israel .................................. 62344

[51] Int. Cl.³ .......................... F16J 15/34; F16J 15/40
[52] U.S. Cl. .......................................... 277/3; 277/74; 277/96.1; 277/133
[58] Field of Search .................. 277/3, 13, 14 R, 14 V, 277/30, 74, 81 R, 81 P, 133, 96, 96.1

[56] References Cited

U.S. PATENT DOCUMENTS

| | | | |
|---|---|---|---|
| 2,250,348 | 7/1941 | Beier | 277/86 |
| 3,383,116 | 5/1968 | Carter | 277/96.1 |
| 3,751,045 | 8/1973 | Lindeboom | 277/96.1 X |
| 4,026,564 | 5/1977 | Metcalfe | 277/96.1 |

FOREIGN PATENT DOCUMENTS

| | | | |
|---|---|---|---|
| 121876 | 11/1927 | Switzerland | 277/96.1 |
| 690569 | 4/1953 | United Kingdom | 277/96.1 |
| 847720 | 9/1960 | United Kingdom | 277/96.1 |

Primary Examiner—Robert S. Ward, Jr.
Attorney, Agent, or Firm—Browdy & Neimark

[57] ABSTRACT

A hydrodynamic, non-contacting end-face seal for a rotary machine comprises a rotor mounted on the machine shaft and a ring-shaped stator facing the flat and smooth surface of the rotor at a short distance. The stator encloses the machine shaft, is eccentrically positioned in respect of the rotor center, and is urged towards the rotor surface by a helical spring. The surface of the stator ring is shaped to form a circular rim separated from the rotor surface by a very small gap of varying width, and the space enclosed by this rim is raised to a higher pressure than the surroundings by the hydrodynamic action of the surface velocity of the rotor on the liquid in the machine, by making the gap width as follows: the gap width between rotor and stator is of a mechanically permissible minimum in all points of the rim at which the velocity vector of the rotor surface extends from the inside of the rim to the outside, and the gap width is larger in all points of the rim at which the velocity vector extends from the outside to the inside. The gap width is changed, in accordance with pressure conditions in the machine by action of the helical sprin

9 Claims, 5 Drawing Figures

U.S. Patent    Oct. 4, 1983    Sheet 1 of 3    4,407,509

ZERO-LEAKAGE NON-CONTACTING MECHANICAL FACE SEAL FOR ROTARY MACHINES

This invention relates to shaft seals for rotary machines and more particularly to a non-contacting end-face seal adapted to separate two spaces maintained at different pressures and to prevent fluid from passing from the high-pressure zone to the low-pressure zone.

Two types of seals are in common use, viz. contacting and non-contacting seals. Generally speaking, a mechanical contact between the seal faces, such as for example in U.S. Pat. No. 2,250,348, practically eliminates leakage but at the expense of high friction losses, wear and consequent short service life. U.S. Pat. No. 4,026,564 seeks to reduce the friction by introducing a relatively large gap between the seal faces, but this inevitably leads to leakage losses. Non-contacting face seals of the type shown in U.S. Pat. No. 3,751,045 represent a compromise, putting up with some leakage by reducing the gap to a small value just sufficient to avoid any rubbing contact.

There are many instances in which the escape of a fluid must be prevented at all costs, such as poisonous, corrosive, radioactive, or very expensive fluids, and there may be other reasons. Long service life is a desirable quality per se. It is therefore, the object of the present invention to provide a non-contacting face seal for these tasks. It is a further object to provide such a seal at low initial and low maintenance cost by using simple components in its construction, and to make the seal long-lasting by preventing the wear and tear due to the contact between the seal faces.

The invention is based on the following principle:

A fluid in a gap, of width h, between a stationary surface and a moving one is dragged by the moving surface in the direction of the velocity vector, v, the fluid flow, $Q_1$, per unit length being expressed by the equation $$Q_1 = v \cdot h/2. \tag{1}$$

In the case of the moving surface progressing from a low-pressure to a high-pressure zone ($P_2$ and $P_1$ respectively) there is also a pressure-induced flow, $Q_2$, in the opposite direction, and this is expressly by the equation $$Q_2 = (h^3/12 \cdot \mu) \cdot [(P_1 - P_2)/L]. \tag{2}$$

L being the length of the gap in the direction from high to low pressure, and $\mu$—the viscosity of the fluid.

In order to prevent fluid from passing through the gap from the high-pressure zone to the low pressure zone, $Q_1$ must be equal to, or exceed, $Q_2$, i.e. conditions must be created in which one of the faces of a gap seal always moves in the direction from low pressure to high pressure. Since such motion is not obtainable with one rotating axisymmetric surface and one stationary surface, the solution lies in providing a rotor and a stator separated by a narrow gap, so constructed that flow conditions are not uniform along the circumference, but differ for every point of the sealing surfaces.

The gap seal according to the invention comprises: 1. A rotor mounted on the machine shaft and rotating therewith and having a smooth, preferably planar surface; 2. A stator surface distanced from the rotor surface by a gap, said surface forming a partition between zones of different pressures and being in the shape of a closed curve of a solid height having an inside enclosing the rotor shaft and an outside contained within the rotor periphery. The curve is further characterized by the property that a tangent to any point of the curve forms an acute, positive or negative, angle with the velocity vector of the rotor passing through this point. All points of the stator surface at which the rotor velocity vector extends from the inside towards the outside of the curve are separated from the rotor surface by a gap of predetermined width, and all points of the stator surface at which the rotor velocity vector extends from the outside towards the inside of the curve are separated from the rotor surface by a gap of a width different from that at the points with outwardly extending velocity vectors.

Taking now the case of the pressure on the outside of the curve being greater than that on the inside thereof, then at each point of the curve at which the velocity vector is directed outwardly, fluid is carried in that direction against the pressure differential; conversely at all points at which the velocity vector is inwardly directed, fluid is carried in an inward direction, assisted by the pressure differential. Since the curve is preferably symmetrical and symmetrically positioned with respect to a rotor diameter, fluid will be carried inwardly over one half of the curve and carried outwardly over the other half. By providing a wide gap along the outflow portion and a narrow gap along the inflow portion, the outflow through the wide gap—pressure on both sides of the curve being equal—will be larger than the inflow through the narrow gap, as shown by equation (1); this because the flow is proportional to the gap width. However, the pressure differential will cause an inward flow in accordance with equation (2), and in order to obtain a perfect seal, the outflow must equal to or exceed the total inflow. By judiciously selecting the shape of the curve, its breadth, and the width of the gap, it is possible to balance inflow and outflow for a specific pressure head.

Figure 2:
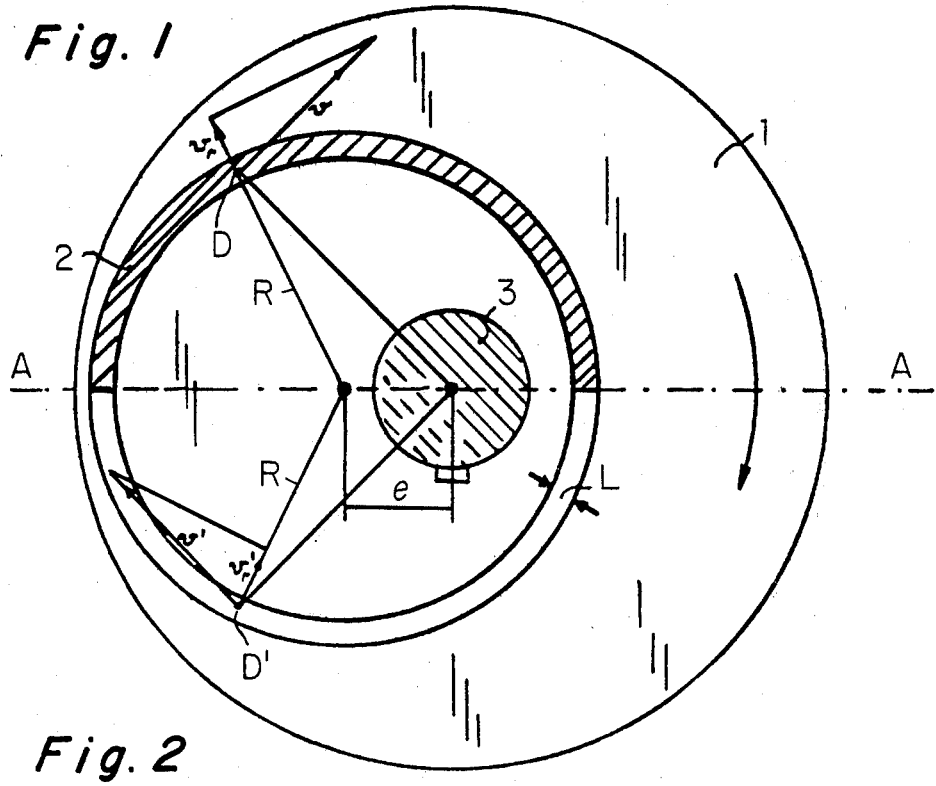
Figure 3:
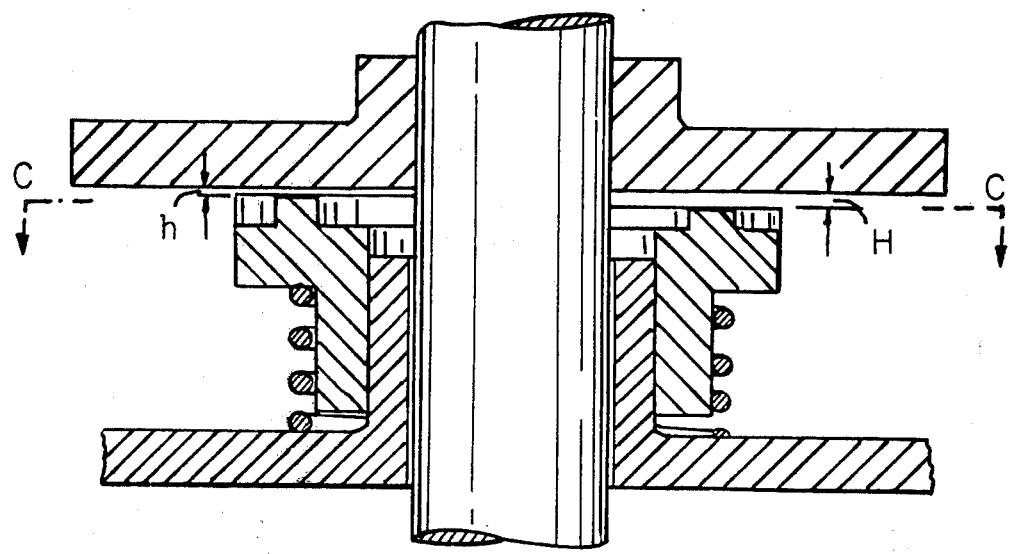
Figure 4:
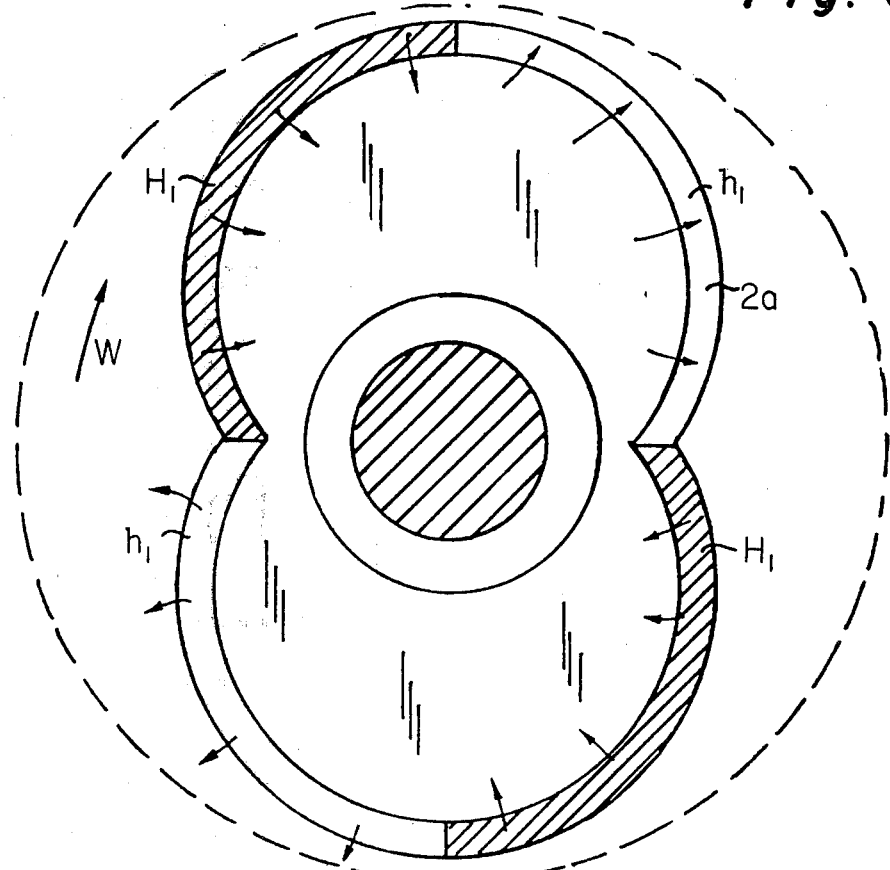
Figure 5:
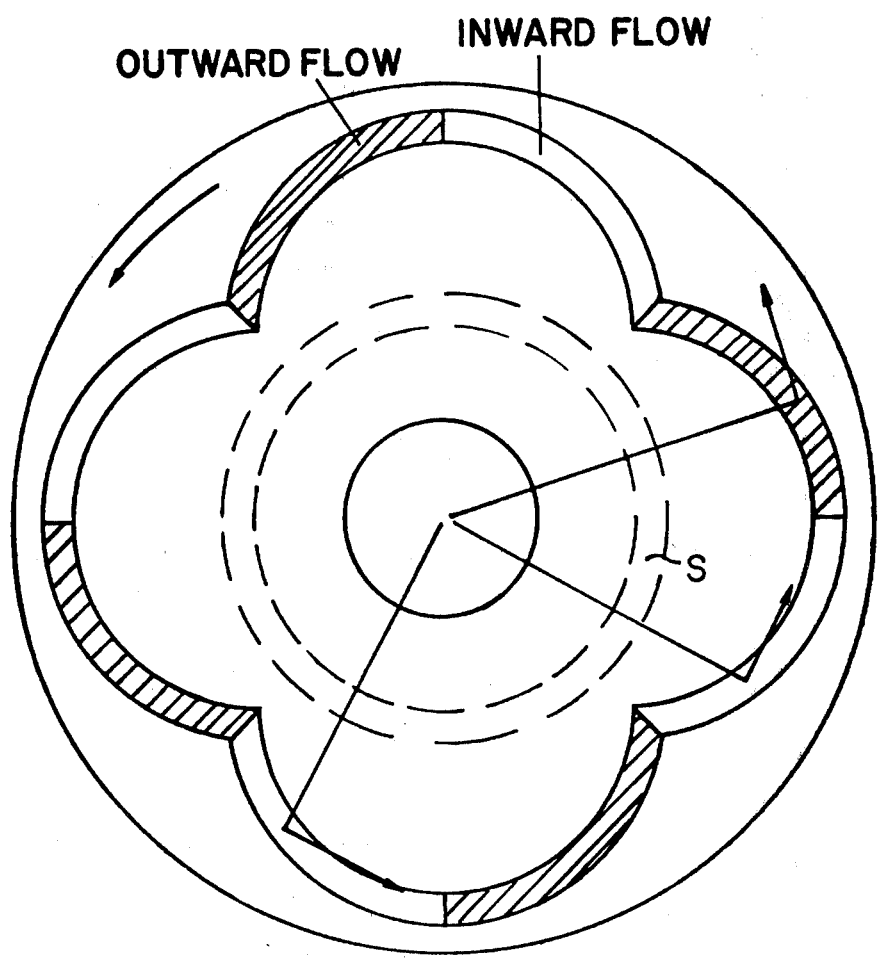

In the accompanying drawings which represent, by way of example, diagrammatical illustrations of three embodiments of the non-contacting end face seal, FIG. 1 is a section through a face seal provided with an eccentrically positioned circular stator surface, FIG. 2 is a section along B—B of FIG. 1 illustrating the flow geometry between rotor and stator, FIG. 3 is a section through another embodiment of the face seal, having a stator surface symmetrical with respect to the rotor surface, FIG. 4 is a section along C—C of FIG. 3, and FIG. 5 is a plan view of still another stator surface.

With reference to FIGS. 1 and 2 of the drawings, a rotor 1 fastened to a machine shaft 3 and rotating clockwise (as indicated by an arrow), is separated from a stator 2 by a gap, of width h for half its circumference and of width H for the other half. The stator 2 is in the shape of an annular surface of median radius R and breadth L. The stator centre is eccentric to the rotor centre by a distance e, the centres of the rotor and of the stator lying on a bisector line A—A. Viewing the upper half of FIG. 2, i.e. the portion above the bisector A—A, and especially point D on the stator, it becomes apparent that each point of the rotor at a radius R has a velocity v from the inside to the outside of the stator surface. As a result the fluid in the gap is moved across the breadth of the stator at velocity $v_r$, $v_r$ being the component of the velocity v in the direction of the stator radius R.

It is also apparent that at every point in the upper half, above the bisector, there is an outwardly directed velocity vector which decreases to zero while approaching the bisector line. It is likewise evident from the portion of the diagram containing point D' (below the bisector), that at every point of the rotor the velocity vector v' is inwardly directed, from the outside towards the inside of the stator surface. By making the gap H on the side above the bisector larger than the gap h below the bisector a larger fluid volume is moved outwardly than inwardly at every two points positioned symmetrically with respect to both sides of the bisector. This can be shown analytically to be so by consulting eq. (1), the net outward flow being:

$$dQ_t = dQ_1 - dQ'_1 \qquad (3)$$

or integrated for the circumference of the stator $$Q_t = w \cdot e \cdot R(H-h). \qquad (4)$$

The foregoing description refers to only one embodiment of the invention, viz. to a smooth surfaced rotor and to a stator surface in the shape of a closed curve. The same result will, however, be obtained by exchanging the tasks of the rotating and the stationary parts, since the effect here described is due to the relative velocity between stator and rotor.

In the alternative construction, therefore, the stator will have a smooth, planar surface, while the rotor is provided with a raised, closed curve on its surface, the curve being separated from the stator surface by a gap of varying width, in accordance with the relative velocity vector at every point of the curve.

The flow through the gap is the difference between the above outflow and the inflow due to the pressure gradient $P_1 - P_2$, (equation 2). Hence the flow, Q, through the gap is $$Q = R \cdot (H-h) \cdot w \cdot e - \pi \cdot R \cdot (H^3 + h^3) \cdot (P_1 - P_1)/12 \cdot \mu \cdot L. \qquad (5)$$

For given operational conditions, viz. a pressure differential $P_1 - P_2$, rotational speed w, and fluid viscosity $\mu$, a seal geometry, consisting of H, h, L, and e, can be selected such that Q is either zero or positive, thereby preventing fluid flow from the high-pressure to the low-pressure zone.

FIG. 1 also shows some constructional details of an end-face seal according to the invention. The stator 2 is of annular shape having a cylindrical bore and is axially displaceable along a cylindrical hub 5 which forms an internal extension of a housing, 4. The cylindrical surface of the hub is eccentric to the shaft axis by the distance e, causing the eccentric position of the stator; the two bodies are mutually sealed against the penetration of fluid by a circular gasket or O-ring 6. A helical spring 7 serves to urge the stator towards the rotor surface. The helical spring 7 may be replaced by any suitable means for urging the stator towards the rotor surface, e.g. a bellows or a series of suitably disposed small helical springs. It should be understood that, in the drawing the gaps, H and h, and the difference between them are, for the sake of clarity, shown much wider than they are in practice, viz. fractions of a millimeter.

The face seal illustrated in FIGS. 3 and 4 is almost identical with that of FIGS. 1 and 2, except for the fact that the stator curve 2a is symmetrical in relation to the shaft axis, resulting in balanced pressure distribution on the rotor. The stator curve is composed of two merging circular arcs which are separated from the rotor surface by two wide gaps $H_1$ and two narrow gaps $h_1$. The flow direction shown is that obtained by a clockwise rotation of the rotor.

Still another shape of the stator curve is illustrated in FIG. 5, showing a curve symmetrical with respect to the rotor axis and composed of four circular arcs. As in the foregoing figure, each of the four arcs is divided into a narrow-gap and a wide-gap surface. Yet other configurations are possible involving different combinations of equal arcs, each showing the gap widths, h and H. The final choice will be governed by manufacturing and other considerations.

Whenever leakage must be prevented at low speed and at standstill, the seal of the invention can be provided with a barrier, such as a ring (S in FIG. 5) either placed within or enclosing the closed curve and separated from the opposite surface by a gap of width h or less.

During the actual test carried out with a circular face seal, a pressure differential of 11 kg/cm² was attained, the seal having the following dimensions and working under the following conditions:

Eccentricity e=21 mm
Breadth L=4 mm
Wide gap H=0.018 mm
Narrow gap h=0.010 mm
Viscosity=0.030 Pa sec.
Ang.Velocity w=100 rad/s In order to prevent fluid from passing through the seal regardless of the pressure head it is necessary to adjust the width of the gap as dictated by changing pressure heads. This can be accomplished by suitably calculating and choosing the dimensions and properties of the helical spring 7 of the FIG. 1. Another possibility is to connect the stator to a mechanical or hydraulic mechanism adapted to move the stator in an axial direction towards, or away from, the rotor surface, in accordance with a signal received from a sensor, this sensor being susceptible to changes in pressure or in fluid velocity.

As an alternative use of the invention, fluid may be permitted to pass through the gap, either to the inside or to the outside of the curved stator surface, thereby obtaining a pumping effect similar to the action of a centrifugal or centripetal pump. It will be understood that in this case openings must be provided inside and outside of the curve serving as inlet and outlet, for the fluid to be pumped. Such pumps will be great value wherever contamination of the fluid pumped must be prevented at all costs. Since there is no mechanical contact of rotating parts in this kind of pump no solid particles can be abraded which may enter the fluid. One of the proposed applications would be a blood pump as used in heart and kidney operations, where any kind of pollution could be fatal.

In the foregoing only two configurations of the stator surface have been described, but it will be understood that many other kinds of curves may be employed for the same purpose, the condition, in accordance with the invention, being that there are alternate stretches in which the velocity vectors are respectively directed towards the inside and the outside of the curve. The curve must not necessarily be symmetrical, neither with regard to its own bisector nor with regard to the rotor axis; but it is self-evident that the symmetrical curve such as, for instance, depicted in FIG. 4, loads the rotor symmetrically, which is advantageous for the balance of the rotating parts.

Instead of providing uniform gap widths, h and H, along a complete arc of the closed curve, the width may gradually increase and decrease in accordance with the changes in the vector component $v_r$ (FIG. 2).

I claim:

1. A non-contacting end-face seal for a rotary machine, said seal comprising a rotor mounted on the shaft of said machine and rotating therewith and a stator connected to the housing of said machine, said rotor and said stator having opposing, smooth and preferably planar surfaces separated by a gap of at least two sizes of width, the seal being characterized by one of the two opposing surfaces being smooth and uniform and the other opposing surface being in the shape of a closed curve having an inside enclosing said shaft and an outside contained within the contours of the opposite surface, said closed curve forming a partition between a zone of higher pressure and a zone of lower pressure and being so formed that a tangent to every point of said curve forms an acute, positive or negative angle with the relative velocity vector passing through that point or coincides therewith and that at all points of said curve where the relative velocity vector is directed from the zone of higher pressure to the zone of lower pressure the width of the gap between said opposing surfaces is smaller than it is at those points where the relative velocity vector is directed from the zone of lower pressure to the zone of higher pressure.

2. The non-contacting end-face seal of claim 1, wherein said rotor surface is smooth and planar and said stator surface is in the form of said closed curve.

3. The non-contacting end-face seal of claim 1, wherein said stator surface is smooth and planar and said rotor surface is in the form of said closed curve.

4. The non-contacting end-face seal of claim 2, wherein the stator surface is of an annular and circular shape of uniform breadth, the centre of said stator surface being positioned at a distance from the axis of said rotor surface, said stator surface being distanced from said rotor surface by a narrow gap of width h at all points lying on one side of an imaginary straight line drawn through the centres of said rotor and of said stator surfaces, and by a wider gap, of width H, at all points lying on the other side of said imaginary line.

5. The non-contacting end-face seal of claim 1, comprising means for altering the distance between the respective surfaces of said rotor and said stator.

6. The non-contacting end-face seal of claim 4 or 5, wherein the stator surface forms an integral part with an annular body which is axially movable with respect to the rotor surface and is urged towards said rotor surface by elastic means.

7. The non-contacting end-face seal of claim 6, wherein the elastic means is a spiral spring.

8. The non-contacting end-face seal of claim 5, wherein said rotor is axially movable along the shaft of the machine and is urged towards said stator surface by elastic means.

9. The non-contacting end-face seal of claim 2, wherein the stator surface is in the form of two or more equal annular circular arcs forming a closed curve and joined at their end points, said stator surface forming alternate wide and narrow gaps with said rotor surface, each gap extending for one half of the length of each arc.

* * * * *